Patented Feb. 12, 1952

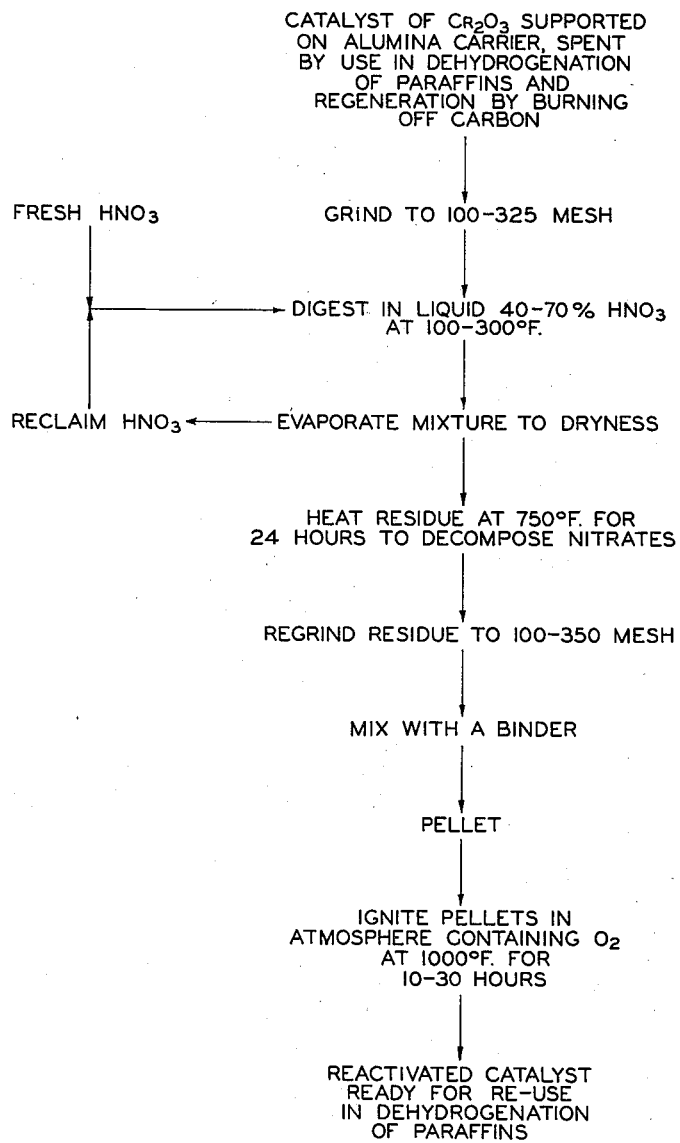

UNITED STATES PATENT OFFICE 2,585,033

REACTIVATION OF A DEHYDROGENATION CATALYST

Emory W. Pitzer, Bartlesville, Okla., assignor to Phillips Petroleum Company, a corporation of Delaware Application December 23, 1946, Serial No. 717,958

10 Claims. (Cl. 252—413)

This invention relates to the reactivation of metal oxide catalysts which have become spent by prolonged use in dehydrogenation of paraffins to less saturated aliphatic hydrocarbons, specifically olefins and diolefins, with periodic regeneration with an oxygen-containing gas to remove the carbon deposited during the dehydrogenation portion of the cycle by burning off said carbon with oxygen.

The use of oxide catalysts for the dehydrogenation of paraffins to form olefins and diolefins is well known in the art. Such catalysts usually comprise at least one heavy metal oxide such as chromium sesquioxide supported on a relatively inactive carrier material such as alumina. In commercial practice, normal butane is converted to normal butylenes and butadiene by contacting with a chromia-magnesia-alumina catalyst (typically containing 12 weight per cent $Cr_2O_3$, 2 weight per cent MgO and 86 weight per cent $Al_2O_3$) at a temperature of about 1000 to 1200° F. and a space velocity of about 500 to 1000 gaseous volumes of normal butane (STP) per volume of catalyst per hour. Carbon is deposited on the catalyst during the reaction and is subsequently removed by contact with an oxygen-containing regeneration gas at an elevated temperature. Commercial operation often comprises alternate dehydrogenation and regeneration periods of about one hour each.

After prolonged use, the catalyst declines in activity even though the carbon deposits are periodically removed by burning in the manner described. The deactivated catalyst has heretofore been discarded since it was supposed that there was no practical way of reactivating it. This discarding of materials such as alumnia and chromia is wasteful and represents considerable expense in the operation of a large dehydrogenation plant.

The principal object of the present invention is to provide a simple and practical method of reactivating metal oxide catalysts which have become deactivated in the dehydrogenation of paraffins as described above. Another object is to provide such a method for the reactivation of dehydrogenation catalysts of the chromia-alumina type that is which comprise a minor proportion of chromium sesquioxide supported on a major proportion of alumina as a carrier. Another object is to provide a reactivation method of the foregoing type which is easily carried out with a minimum of labor and which involves a minimum consumption of valuable chemicals. Another object is to provide an improved paraffin dehydrogenation process wherein a catalyst comprising a minor proportion of a dehydrogenating metal oxide and a major proportion of alumina as a carrier is used. Numerous other objects will more fully hereinafter appear.

The accompanying drawing which is self-explanatory in the light of the present specification, is a flow diagram of a typical method of reactivating a chromia-alumina catalyst in accordance with the present invention.

I have now found that a paraffin dehydrogenation catalyst comprising a minor proportion of a dehydrogenating metal oxide supported on a carrier, which is preferably relatively inert or inactive, and which catalyst has become spent by alternate paraffin dehydrogenation and regeneration with an oxygen-containing gas to remove carbon deposited thereon during the dehydrogenation can be reactivated by grinding the spent catalyst, digesting the ground catalyst with liquid concentrated nitric acid, evaporating the resulting mixture to dryness, heating the residue to decompose the nitrates, shaping the resulting material into uniformly shaped bodies and igniting these bodies.

I prefer to grind the spent catalyst to about 100- to 325-mesh size, digest the ground material at an elevated temperature of from 100 to 300° F. with nitric acid having a concentration of from 40 to 70 weight per cent (the balance of the nitric acid of course being water) for from 5 to 50 hours, evaporate the mixture to dryness, heat the residue to 750° F. for 24 hours to convert the salts formed during the digestion to the corresponding oxides, mix the resulting material with a binder, pellet or otherwise shape into uniform bodies, and ignite the pellets or other uniformly shaped bodies in an oxygen-containing atmosphere at about 1000° F. for about 10 to 30 hours to remove the binder.

While the present invention is particularly applicable to paraffin dehydrogenation catalysts of the chromia-alumina type i. e. comprising a minor proportion of $Cr_2O_3$ supported on a major proportion of $Al_2O_3$ as a carrier, it may be applied to the reactivation of other supported metal oxide dehydrogenation catalysts.

Examples of dehydrogenating metal oxides other than $Cr_2O_3$ which possess the ability to catalyze the dehydrogenation of paraffins are the oxides of molybdenum, tungsten, uranium, vanadium, titanium, manganese, etc. In general these oxides can be characterized as difficultly reducible heavy metal oxides having dehydrogenating properties.

As the carrier, I prefer alumina, especially that form of alumina known as "activated alumina" which is a material of commerce made by precipitating the trihydrate of alumina from an aluminate solution and calcining the precipitate at a temperature of from 300 to 800° C.

Instead of activated alumina of commerce, I may use other forms of activated alumina such as activated bauxite or any other form of alumina which is suitable as a carrier for the dehydrogenating heavy metal oxides.

Instead of alumina as a carrier I may though somewhat less desirably use any other relatively inert supporting material, examples being magnesia, such as activated magnesia for example calcined brucite, activated clays, activated carbon, zirconia such as zirconia gel, silica gel, etc.

The dehydrogenation catalyst which is reactivated in accordance with the present invention may also contain in addition to the chromia or other dehydrogenating metal oxide and the support such as alumina, small amounts of other materials which have been found to be beneficial. For example the catalyst may contain small amounts of magnesium oxide or beryllium oxide. Similarly it may contain small amounts of alkali metal oxides. The purpose of incorporating a small amount of magnesium oxide or beryllium oxide in the catalyst manufacture may be to stabilize the alumina in a desirable form thereby preventing its gradual change to a less desirable form. The alkali metal oxides may increase the life of the catalyst as by reducing carbon deposition and in general may increase the effectiveness of the catalyst.

Although the mechanism whereby dehydrogenation catalysts of the type represented by dehydrogenating metal oxides supported on relatively inactive carriers become deactivated during use in repeated cycles of paraffin dehydrogenation and regeneration by burning off the carbon deposited thereon, and the mechanism of the reactivation brought about in accordance with the present invention are incompletely understood at the present time, the following hypothesis seems reasonable and is offered:

During the alternate dehydrogenation and carbon removal the catalytic material, for example chromium sesquioxide, and the carrier, for example alumina, partially fuse together to form a catalytically inactive solid solution. This is especially true when the carrier is a metal oxide such as alumina or magnesia since two oxides can conceivably fuse together to give a compound. This fusion removes the active catalytic centers of chromium sesquioxide from the catalyst. The digestion with liquid concentrated nitric acid in accordance with my invention extracts the chromium sesquioxide or other dehydrogenating metal oxide from such a solid solution and the chromium sesquioxide is recovered, after the subsequent ignition, in a catalytically active form.

This hypothesis is based, in part, on the observation that, after the digestion of a spent chromia-magnesia-alumina catalyst with liquid concentrated nitric acid, the supernatant acid has a yellow color similar to that of chromic acid.

The process of my invention is entirely distinct from that described in U. S. Patent 2,381,659, issued August 7, 1945, to F. E. Frey. The Frey patent discloses the reactivation of sulfur-poisoned metallic hydrogenation catalysts by a series of steps including treatment with nitrates and/or nitric acid. It is emphasized that the catalysts treated by the process of the present invention are, in general, not susceptible to poisoning by sulfur and in addition, in most cases if not always, are substantially carbon-free. Not only are the catalysts reactivated in accordance with the present invention completely different from the catalysts with which Frey is dealing but also the method of reactivation of the present invention is completely different from the method of Frey. Furthermore the mechanism of deactivation of the catalysts treated in accordance with the present invention and of the reactivation of the present invention are entirely different from the corresponding mechanisms in the Frey process.

I am also aware of U. S. patents to De Rewal 1,952,911, Midgley 1,446,984 and Jaeger 1,678,627. De Rewal activates a different catalyst namely cobalt oxide that has deteriorated in a different service namely ammonia oxidation, in a dfferent manner that is by digestion with hydrochloric acid, washing, moistening the washed material with nitric acid and igniting the moistened material. Midgley effects solution of his entire catalyst in nitric acid whereas I effect solution of only a portion of my catalyst. Furthermore Midgley's catalysts are typified by nickel oxide which has become poisoned by use in hydrogenation.

The Jaeger patent is concerned with the treatment of oxidation catalysts, namely vanadates and molybdates, not supported oxide catalysts used for paraffin dehydrogenation. The chemical and catalytic characteristics of these two classes of catalysts are quite different. Nothing in the Jaeger patent would suggest the treatment of a dehydrogenation catalyst with liquid, aqueous nitric acid. Jaeger uses nitric acid vapor which would not have the solvent effect on the dehydrogenating metal oxide which my liquid aqueous concentrated nitric acid has. The statement by Jaeger at page 1, lines 100 to 105 to the effect that when oxides of nitrogen or nitric acid vapors are used, the treatment with an oxygen-containing gas may be omitted, indicates that the nitric acid vapor used by Jaeger does not exert any solvent or chemical action on the catalyst other than oxidation. Otherwise, nitrates would be formed and would have to be reconverted to the catalyst components. Nitric acid vapor would undoubtedly be quite satisfactory for removing carbon from vanadates and molybdates. It should be pointed out however that carbon removal is not the problem with which my invention is concerned. Almost invariably the carbon is absent from the catalyst treated by my invention, as a result of the regeneration to burn off carbon in the dehydrogenation cycle. Furthermore the treatment of vanadates and molybdates with liquid aqueous nitric acid would not be beneficial. In fact, it is well known that the treatment of vanadates and molybdates with liquid, aqueous nitric acid decomposes these compounds and form vanadium oxide and molybdenum oxide, respectively.

The Jaeger patent mentions as treating agents a large number of compounds including not only nitric acid vapors but also a number of halogen compounds. Jaeger apparently considers all these compounds to be substantially equivalent so far as effectiveness in regenerating his catalysts is concerned and undoubtedly they are substantially equivalent when applied to his catalysts. On the other hand, treatment of dehydrogenating metal oxide catalysts of the type to which my invention is applied and typified by chromia supported on alumina, with halogen compounds is known to be distinctly deleterious and is avoided in the practice of my invention.

So far as I am aware it has never been thought possible or practical to reactivate a catalyst such as chromia supported on alumina which has been deactivated by repeated cycles of dehydrogenation and carbon removal. I believe that I am the first to discover that a chromia-alumina catalyst which has lost its activity as a result of repeated cycles of dehydrogenation and regeneration and apparent partial fusion of these oxides to form a solid solution can be reactivated by digestion with strong liquid nitric acid followed by ignition.

My invention may be applied to any granular supported metal oxide dehydrogenation catalyst. Generally the catalyst is in the form of pellets or other uniformly shaped bodies. In accordance with my invention the reactivated catalyst is reconstituted in the form of such uniformly shaped bodies. Any of the methods of shaping common in the art may be employed. Generally the catalyst will be shaped by pelleting that is by compressing the powder in a pelleting or tableting machine of well known type. However instead of pelleting other methods of shaping may be used such as extrusion or the like. I commonly admix a binder with the residue prior to the shaping operation. Any binders known to be satisfactory for this purpose may be employed. A very suitable binder is an oil of the glyceride type such as hydrogenated peanut oil. The binder may also function as a lubricant in the pelleting or shaping operation.

The nitric acid used in accordance with the present invention should be fairly concentrated. I normally use nitric acid having a strength of from 40 to 70 weight per cent. A number of grades of nitric acid falling within this range are available as articles of commerce. If desired, nitric acid stronger than 70 per cent ranging therefrom up to say 95 per cent may be employed.

The relative amounts of catalyst and concentrated nitric acid may vary over quite wide limits. Generally however I prefer to use such an amount of the nitric acid that when the ground catalyst is admixed with it preparatory to the digestion, a substantial excess of nitric acid is present. In other words a separate or supernatant layer of nitric acid should be present if the mixture undergoing digestion is allowed to settle. A weight ratio of nitric acid to catalyst in the neighborhood of 2:1 is very convenient. This ratio is for the case where 70% nitric acid is employed. When nitric acid of lower concentration than 70% is used, this ratio may be increased if desired.

However the use of a great excess of nitric acid is ordinarily not preferred because it represents an unnecessary consumption of heat in order to evaporate the digested mixture to dryness.

It is highly desirable to recover the nitric acid from the vapors driven off during the evaporation step. This may be done in any suitable manner. The nitric acid so recovered is recycled for re-use in the digestion step. If desired provision may also be made to recover the nitrogen oxides liberated during the heating step which follows the evaporation.

The catalyst treated in accordance with the present invention may be used for any process in which paraffins are catalytically dehydrogenated to less saturated aliphatic hydrocarbons, particularly olefins and diolefins. Thus far the only commerical catalytic paraffin dehydrogenation process has been the dehydrogenation of normal butane to normal butylenes, usually together with some butadiene. However it will be understood that the catalysts to which the present invention is applied may be used in the dehydrogenation of other paraffin such as isobutane, any of the pentanes, any of the hexanes, etc.

The following example illustrates a typical method of carrying out reactivation in accordance with the present invention.

A catalyst that had been deactivated as a result of continuous use for about 100 days, in alternate one-hour reaction and carbon-removal periods, in a commercial plant in which normal butane was dehydrogenated to obtain normal butylenes and butadiene had approximately the following composition: 86 weight per cent $Al_2O_3$, 12 weight per cent $Cr_2O_3$ and 2 weight per cent MgO. This catalyst was made by impregnating an activated alumina carrier with a solution of chromic acid and magnesium nitrate followed by ignition in the usual manner.

This deactivated catalyst was tested for normal butane dehydrogenation at 1000° F. and at a space velocity of 500 gaseous volumes of normal butane (STP) per volume of catalyst per hour in a laboratory apparatus.

Another portion of the same deactivated catalyst was ground to 325-mesh size, mixed with 5 per cent of a hydrogenated peanut oil, formed into pellets ⅛ inch in diameter and ⅛ inch long, and ignited in air at 1000° F. These pellets were tested for butane dehydrogenation in the manner described in the preceding paragraph.

Another portion of the same spent catalyst was ground to 325-mesh size, and digested with 70 per cent nitric acid for 30 hours at 250° F. The mixture was then evaporated to dryness, the residue was heated at 750° F. for 24 hours, the material was then reground to 100–325-mesh, the reground material was pelleted using a hydrogenated peanut oil as a binder, and the resulting pellets were ignited in a current of air at 1000° F. for 18 hours. The pellets were tested at 1000° F. and a space velocity of 500, for the dehydrogenation of normal butane in the manner described above in the penultimate paragraph.

The results of the aforementioned tests are summarized in the following table:

| Catalyst | Yield per pass of Butylenes Plus Butadiene, Wt. Per Cent of Charge | Carbon Production, Wt. Per Cent of Charge |
|---|---|---|
| Untreated, deactivated catalyst | 30.1 | 0.9 |
| Ground and pelleted | 32.6 | 1.4 |
| Ground, $HNO_3$-treated and pelleted | 35.0 | 2.0 |

The process of my invention consists of the steps indicated on the drawing namely grinding the catalyst, digesting the ground catalyst in liquid concentrated aqueous nitric acid, evaporating the mixture to dryness, heating the residue to decompose the nitrates formed during the digestion step to the oxides, regrinding the residue, mixing the residue with a binder, shaping the resulting mixture, generally by pelleting, and igniting the shaped bodies in an oxygen-containing atmosphere for a period of time sufficient to remove the binder.

The ignition of the shaped bodies may be carried out in a wide variety of manners. While it is preferred to ignite at 1000° F., a broader ignition temperature range may be employed, say from 600 to 1000° F. Ignition temperatures above 1000° F. are ordinarily not preferred because they may result in injury of the catalyst. Ordinarily the time required for the completion of the ignition will be from 10 to 30 hours.

It will be understood that if other oxides are present in addition to the dehydrogenating metal oxide, for example magnesium oxide or beryllium oxide, the nitric acid digestion may effect partial or complete solution of such other oxides. The subsequent heating will of course redeposit

I claim:

1. The process of reactivating a paraffin dehydrogenation catalyst comprising a dehydrogenating, difficultly reducible, heavy metal oxide supported on a relatively inert supporting material, and which has become spent by alternate paraffin dehydrogenation and regeneration with an oxygen-containing gas to remove by burning off carbon deposited thereon during the dehydrogenation which comprises grinding said spent catalyst, digesting the ground catalyst with liquid concentrated nitric acid, evaporating the resulting mixture to dryness, heating the residue to decompose the nitrate formed during the digestion step, comminuting the residue, mixing it with volatile organic binder, shaping the resulting material into uniformly shaped bodies, and igniting said bodies at a temperature and for a time sufficient to remove the binder.

2. The process of reactivating a paraffin dehydrogenation catalyst comprising a dehydrogenating, difficultly reducible, heavy metal oxide supported on alumina as a carrier and which has become spent as a result of alternate paraffin dehydrogenation and regenation with an oxygen-containing gas to remove by burning off carbon deposited thereon during the dehydrogenation which comprises grinding said spent catalyst, digesting the ground catalyst with liquid concentrated aqueous nitric acid of at last 40 per cent strength at an elevated temperature for a period of time such as to effect extraction of said metal oxide by said nitric acid, evaporating the resulting mixture to dryness, heating the residue to decompose the nitrate formed during the digestion to metal oxide, regrinding the residue, mixing it with a suitable binding material, shaping the resulting material into uniformly shaped bodies, and igniting said bodies in an oxygen-containing atmosphere at a temperature and for a time sufficient to remove the binder.

3. A process of reactivating a paraffin dehydrogenation catalyst comprising a dehydrogenating, difficultly reducible, heavy metal oxide supported on alumina as a carrier and which has become spent as a result of alternate paraffin dehydrogenation and regeneration with an oxygen-containing gas to remove by burning off carbon deposited thereon during the dehydrogenation which comprises grinding said spent catalyst to a particle size of from 100- to 325-mesh, digesting the ground catalyst with liquid concentrated aqueous nitric acid having a strength of from 40 to 70 per cent at an elevated temperature of from 100 to 300° F. for a period of time of from 10 to 40 hours such as to effect at least partial extraction of said metal oxide by said nitric acid, evaporating the resulting mixture to dryness, heating the residue to decompose the nitrate formed during the digestion to metal oxide, regrinding the residue to a particle size of from 100- to 350-mesh, mixing it with a suitable binding material, shaping the resulting material into uniformly shaped bodies, and igniting said bodies in an oxygen-containing atmosphere at a temperature of 600-1000° F. for a time sufficient to remove the binder.

4. The process of claim 2 wherein said metal oxide is $Cr_2O_3$.

5. The process of claim 3 wherein said metal oxide is $Cr_2O_3$.

6. The process of reactivating a paraffin dehydrogenation catalyst consisting of 12 per cent by weight of $Cr_2O_3$ and 2 per cent by weight of MgO supported on 86 per cent by weight of alumina as a carrier and which has become spent as a result of alternate dehydrogenation of normal butane to normal butylenes and butadiene and regeneration with an oxygen-containing gas to remove by burning off carbon deposited thereon during the dehydrogenation which comprises grinding said spent catalyst to 325-mesh size, digesting the ground catalyst with 70 per cent nitric acid for 30 hours at 250° F., evaporating the resulting mixture to dryness, heating the residue at 750° F. for 24 hours to convert nitrate formed during the digestion to metal oxide, regrinding the residue to 100-325-mesh size, mixing the reground residue with 5 per cent by weight based on the weight of the residue of hydrogenated peanut oil as a binder, pelleting the resulting mixture, and igniting the pellets in air at 750° F. for a period of time of from 10 to 30 hours sufficient to remove the binder.

7. A process of reactivating a paraffin dehydrogenation catalyst comprising a dehydrogenating, difficultly reducible, heavy metal oxide supported on alumina as a carrier and which has become spent as a result of alternate paraffin dehydrogenation and regeneration with an oxygen-containing gas to remove by burning off carbon deposited thereon during the dehydrogenation which comprises grinding said spent catalyst, digesting the ground catalyst with liquid concentrated aqueous nitric acid of from 40 to 70 per cent strentgh at a temperature of from 100 to 300° F. for a period of time such as to effect at least partial selective extraction of said metal oxide by said nitric acid, evaporating the resulting mixture to dryness, heating the residue to decompose the nitrate formed during the digestion to metal oxides, regrinding the residue, mixing the reground residue with a hydrogenated peanut oil as a binder, shaping the resulting material into uniformly shaped bodies, and igniting said bodies in an oxygen-containing atmosphere at 600 to 1000° F. for 10 to 30 hours to remove the binder.

8. The process of claim 7 wherein said metal oxide is $Cr_2O_3$.

9. The process of claim 7 wherein said catalyst consists of 12 weight per cent $Cr_2O_3$ and 2 weight per cent MgO supported on 86 weight per cent of alumina.

10. The process of claim 7 wherein said paraffin is normal butane.

EMORY W. PITZER.

REFERENCES CITED

The following references are of record in the file of this patent:

UNITED STATES PATENTS

| Number | Name | Date |
|---|---|---|
| 1,446,984 | Midgley | Feb. 27, 1923 |
| 1,952,911 | DeRewal | Mar. 27, 1934 |
| 2,017,683 | Crittenden | Oct. 15, 1935 |
| 2,112,292 | Jones | Mar. 29, 1938 |
| 2,137,101 | Spicer | Nov. 15, 1938 |
| 2,184,235 | Groll et al. | Dec. 19, 1939 |
| 2,211,208 | Ipatieff et al. | Aug. 13, 1940 |
| 2,215,885 | Roelen et al. | Sept. 24, 1940 |
| 2,232,610 | Joshua et al. | Feb. 18, 1941 |
| 2,316,726 | Spicer et al. | Apr. 13, 1943 |
| 2,323,830 | McMillan | July 6, 1943 |
| 2,381,659 | Frey | Aug. 7, 1945 |